UNITED STATES PATENT OFFICE.

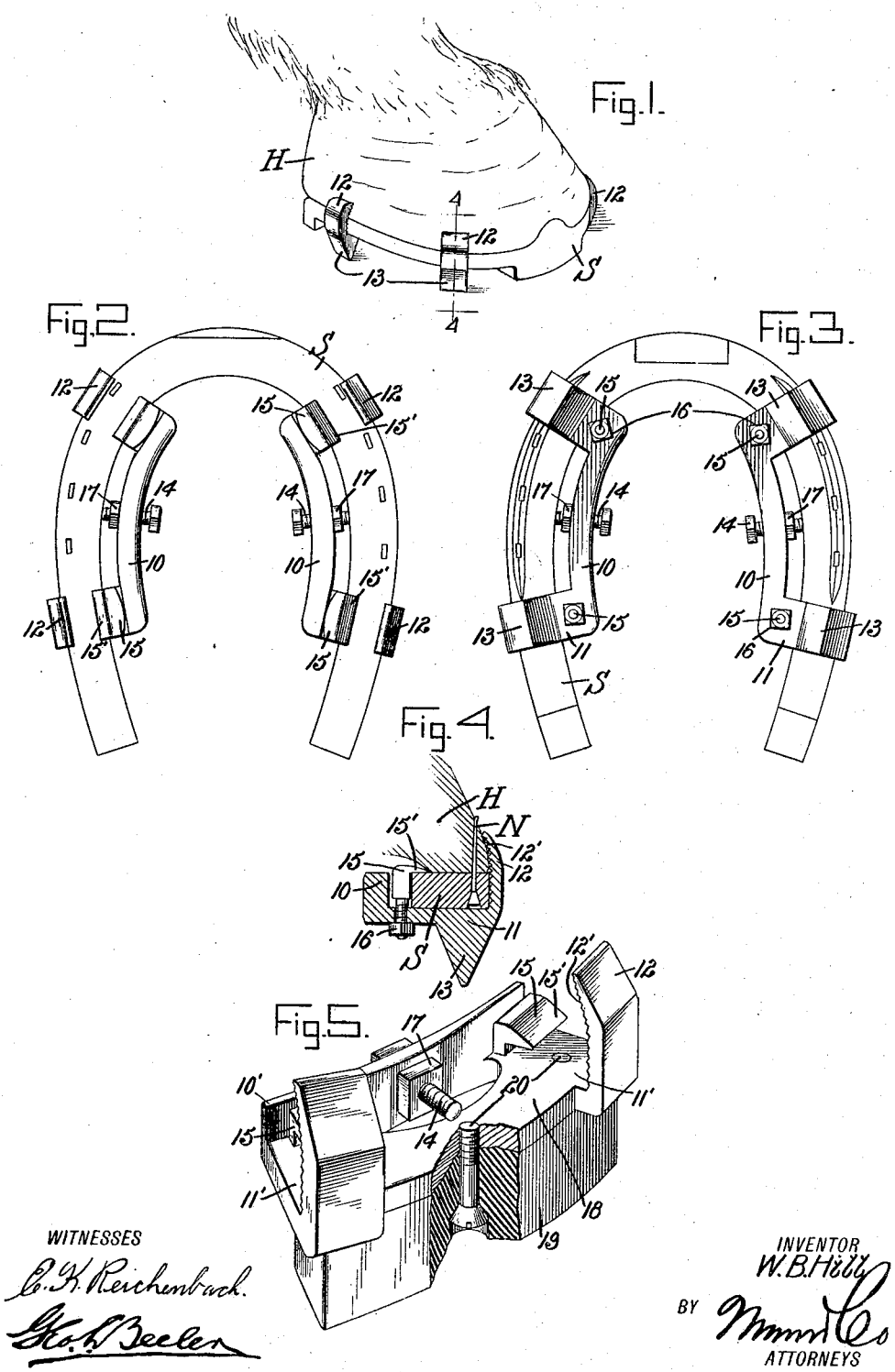

WILLIAM B. HILL, OF NEW YORK, N. Y., ASSIGNOR OF ONE-FOURTH TO ASA SHERWOOD, OF BAYONNE, NEW JERSEY.

DETACHABLE HORSESHOE-CALK.

1,190,897.

Specification of Letters Patent. Patented July 11, 1916.

Application filed May 23, 1916. Serial No. 99,277.

*To all whom it may concern:*

Be it known that I, WILLIAM B. HILL, a citizen of the United States, and a resident of the city of New York, borough of Manhattan, in the county and State of New York, have invented a new and Improved Detachable Horseshoe-Calk, of which the following is a full, clear, and exact description.

This invention relates to farriery and has particular reference to anti-slipping devices for horseshoes adapted to be applied to the ordinary horseshoes in a simple, convenient, and expeditious manner by any driver and at any place where the occasion may require such anti-slipping devices on short notice.

Among the objects of the invention, therefore, is to provide horseshoe calks of a nature readily applied or removed and which may be carried by the driver or vehicle ready for application at any time by the use of a small tool, such as a screw driver or wrench, and when applied will remain in place until their removal is desired, the application of the improved calks being directed to the usual standard shoes, which may or may not be provided with calks.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, in which—

Figure 1 is a perspective view of a hoof and standard shoe to which a pair of my improved devices are secured; Fig. 2 is a plan view of a shoe showing a pair of my improved calks gripped thereto as in use; Fig. 3 is a bottom plan view of the same; Fig. 4 is a vertical sectional detail on the line 4—4 of Fig. 1; and Fig. 5 is a perspective view of a modified form of detachable calk, a part being broken away to show the construction.

Referring now more particularly to the drawings, I show a standard horseshoe S applied to a hoof H by use of nails N in the usual manner, this showing being for the purpose of indicating the manner of application and use of my improvements.

My improvement comprises a bracket 10 of a form in plan curved to correspond to the curvature of the side of a horseshoe and when locked in place lies within the shoe and spaced somewhat from the inner edge of the shoe. From the ends of the bracket there extend outwardly a pair of claws 11, the direction being practically radial with respect to the center of the hoof or shoe, and the points of the claws 12 projecting upwardly along the outer edge of the shoe and being bent inwardly slightly at the top where they engage with the surface of the hoof. These points are serrated, preferably at 12′, to increase the grip upon the hoof. Each of the claws carries a calk 13 which may be of any suitable design or form, the calk shown being of the type having a sharp engaging edge. The direction in which this edge of each claw projects may be varied without departing from the spirit of the invention, but as indicated such edge lies substantially parallel with the shoe and bracket. Each bracket, therefore, carries two engaging calks of the form shown in Figs. 1 to 4.

Each bracket with the two calks carried thereby is adapted to be clamped rigidly to a side of the standard shoe. The clamping means employed, in addition to the upwardly projecting claws, comprises a set screw 14 and a pair of clips 15. The set screw is projected horizontally laterally through the center of the bracket in the plane of the horizontal center of the body of the shoe. This screw is projected outwardly and the point or outer end of the screw bears squarely and forcibly against the inner edge of the shoe, serving to set up powerful gripping tension of the claws against the outer edge of the shoe and the hoof. Downward movement or displacement of the bracket with respect to the shoe is prevented by means of the clips 15 having lips 15′ engaging over the upper surface at the inner edge of the shoe while the shanks of the clips project downwardly through the base portion of the claws 11, nuts 16 being applied to the ends of the shanks to lock the parts in place. The action of the clips 15, furthermore, prevents the tendency of the bracket to tilt around a longitudinal axis, and hence there is no possibility for the outer portions of the claws and the calks carried thereby to be displaced downwardly from the shoe. The curvature of the bracket, furthermore, increases this rigidity or tendency to resist the twisting or tilting action. That is to say, the tilting of either end around an axis parallel to that particular part of the shoe to which such end is connected will be resisted by the clamping means at the other end, such resistance being set up at an angle to the line around which such twisting would take place. After the set screw 14 is tightened, as above set forth, a lock nut 17 will be run up against the outer edge of the bracket so as to reduce the tendency of the set screw to loosen in practice.

These sets of detachable calks are made in various sizes to accord with the various sizes of horseshoes in common use, and each driver will provide himself with the size corresponding to the size of the horseshoes on his teams. With the horses kept shod in the ordinary way for normal service, in the event of a coating of ice or the like upon the roadway or street, the driver will simply apply the detachable calks to the standard shoes in the manner herein set forth, and will be off about his business with but a few minutes delay and with absolute safety for his teams. After the slippery condition of the street is passed, he will ordinarily remove the calks for another emergency.

As an illustration of the different forms in which the improved device may be made, reference is to be had to Fig. 5 in which the bracket 10' is provided with a base 18 connecting the claws 11'. The application of this form of the device to the standard shoe is the same as above described and includes the use of the set screw 14 and clips 15. The calk, however, is in the nature of a rubber cushion 19 and secured firmly to the base 18 by means of a plurality of screws 20 or other equivalent locking means.

I claim:

1. The combination with a standard horseshoe, of an arc-shaped bracket extending along and spaced inwardly from the inner edge of the shoe, a plurality of claws extending outwardly from the bracket along the bottom of the shoe and thence bent upwardly along the outer edge of the shoe and overlapping the outer surface of the hoof to which the shoe is connected, means acting outwardly through the bracket against the inner edge of the shoe to bind the upwardly projecting portions of the claws against the shoe and hoof, means engaging over the upper surface of the shoe along its inner edge and extending thence downwardly between the bracket and the shoe to hold the bracket and claws from downward movement, and anti-slipping means carried by the bracket and base portions of the claws.

2. The combination with a horseshoe, of a bracket of curved form secured to the shoe lying within and parallel to the shoe, a plurality of claws having base portions formed integral with the ends of the bracket and extending along the bottom of the shoe and thence upwardly against the outer edge of the shoe, the upper ends of the claws being bent inwardly and formed with serrations to engage the hoof above the shoe, a pair of clips having lips extending between the inner edge of the shoe and the bottom of the hoof and having shanks projecting downwardly through the base portions of the claws, binding means projecting radially and horizontally through the bracket into binding engagement with the inner edge of the shoe, and anti-slipping means secured to the base portions of the claws and projecting downwardly thereon, substantially as set forth.

WILLIAM B. HILL.